(12) United States Patent
Schuster et al.

(10) Patent No.: US 7,738,491 B2
(45) Date of Patent: Jun. 15, 2010

(54) FRAME STRUCTURE, METHOD FOR ORGANIZING DATA AND METHOD FOR TRANSMITTING DATA

(75) Inventors: Irene Schuster, Kronstorf (AT); Dietmar Wenzel, Munich (DE); Christian Duerdodt, Bochum (DE); Christian Kranz, Ratingen Lintorf (DE); Markus Hammes, Dinslaken (DE); Bernd Schmandt, Wuppertal (DE)

(73) Assignee: Infineon Technologies AG, Neubiberg (DE)

( * ) Notice: Subject to any disclaimer, the term of this patent is extended or adjusted under 35 U.S.C. 154(b) by 337 days.

(21) Appl. No.: 11/778,387

(22) Filed: Jul. 16, 2007

(65) Prior Publication Data

US 2009/0022177 A1 Jan. 22, 2009

(51) Int. Cl.
*H04J 3/16* (2006.01)
(52) U.S. Cl. ............... 370/468; 370/347; 370/466; 455/343.1

(58) Field of Classification Search ............ None
See application file for complete search history.

(56) References Cited

U.S. PATENT DOCUMENTS 6,671,267 B1 * 12/2003 Yano et al. ............ 370/342
2002/0165003 A1 * 11/2002 Rudolf et al. ............ 455/502

* cited by examiner

*Primary Examiner*—Chi H Pham
*Assistant Examiner*—Kouroush Mohebbi
(74) *Attorney, Agent, or Firm*—Eschweiler & Associates, LLC

(57) ABSTRACT

A frame structure for transmitting data over a digital interface has a plurality of data frames. In this plurality of data frames a first sampling data frame is based on at least one sampling word and dedicated to a first logical channel. A set of data frames follows the first sampling data frame and carries in a compressed format a plurality of predefined status data words dedicated at least to the first logical channel. A first further sampling data frame follows the set of data frames. It is based on at least one further sampling word and dedicated to the first logical channel.

39 Claims, 11 Drawing Sheets

FIG 2 channel A

| sampling word (nT) | sampling word (n+1)T | sampling word (n+2)T | sampling word (n+3)T | ... | sampling word (n+15)T |

21 channel B

| X | X | X | sampling word (n+3)T | ... | sampling word (n+15)T |

22 channel A

| sampling word (n+16)T | sampling word (n+17)T | sampling word (n+18)T | sampling word (n+19)T | ... | sampling word (n+31)T |

23 channel B

| sampling word (n+16)T | sampling word (n+17)T | sampling word (n+18)T | sampling word (n+19)T | ... | sampling word (n+31)T |

24

FRAME STRUCTURE, METHOD FOR ORGANIZING DATA AND METHOD FOR TRANSMITTING DATA

FIELD OF THE INVENTION

The invention is directed to frame structures and methods for organizing and transmitting data over an interface such as a digital interface

BACKGROUND OF THE INVENTION

In modern mobile communication systems different mobile radio standards like Universal Mobile Telecommunications System (UMTS), Wideband Code Division Multiple Access (WCDMA), Global System for Mobile communication (GSM), and enhanced data rates for GSM evolution (EDGE) are used. Thereby the GSM standard is often referenced as second generation standard (2G), EDGE is referenced as a standard of generation 2.5 (2.5G) and UMTS is referenced as a third generation standard (3G).

Respective radio frequency (RF) signals are received and processed in a radio frequency unit which for example is used for down converting the radio frequency signals to base band (BB) signals. Such radio frequency units are in many cases implemented in a special integrated circuit. The data received by the radio frequency unit from an antenna are converted to digital signals which are transmitted to a base band unit for further processing. A function of the radio frequency unit can be controlled by the base band unit. It is furthermore possible that an interface between the radio frequency unit and the base band unit is realized as a digital interface. Such an interface is not restricted to transmit received (RX) data from a radio frequency unit to a base band unit but also to transmit data to be transmitted (TX) via a radio frequency unit between a base band unit and the radio frequency unit.

Respective base band units and radio frequency units can be able to operate within the GSM/EDGE standard or the UMTS standard or both the GSM/EDGE and the UMTS standard. In other words, various combinations of 2.5G mobile radio standards and 3G mobile communication standards are possible. A GSM/EDGE standard is also referenced as an enhanced general packet radio service (EGPRS).

For example, the DigRF working group released an interface standard called "DigRF dual mode 2.5G/3G base band RFIC interface standard", version 3.09, short DigRF V3.09, which is incorporated herein by reference with its full content. This standard defines a digital serial interface between a base band integrated circuit (BBIC) and a radio frequency IC (RFIC) in both directions, working at a data rate of 312 Mbit/s.

When transmitting data over an interface between a radio frequency unit and a base band unit, it is possible that a time base for the transmitted data has to be defined and adhered to. Furthermore the radio frequency unit can receive radio frequency signals from two or more antennas or receiving paths respectively. The respective data of the different receiving paths can be transmitted to the base band unit separately. Although in this case it can be necessary to define a respective time base for the data to be transmitted over the RF/BB interface.

BRIEF DESCRIPTION OF THE DRAWINGS

The invention is explained in detail below using exemplary embodiments with reference to the drawings in which:

FIG. 2 is a first exemplary embodiment of a frame structure.

DETAILED DESCRIPTION OF THE INVENTION

Figure 1:
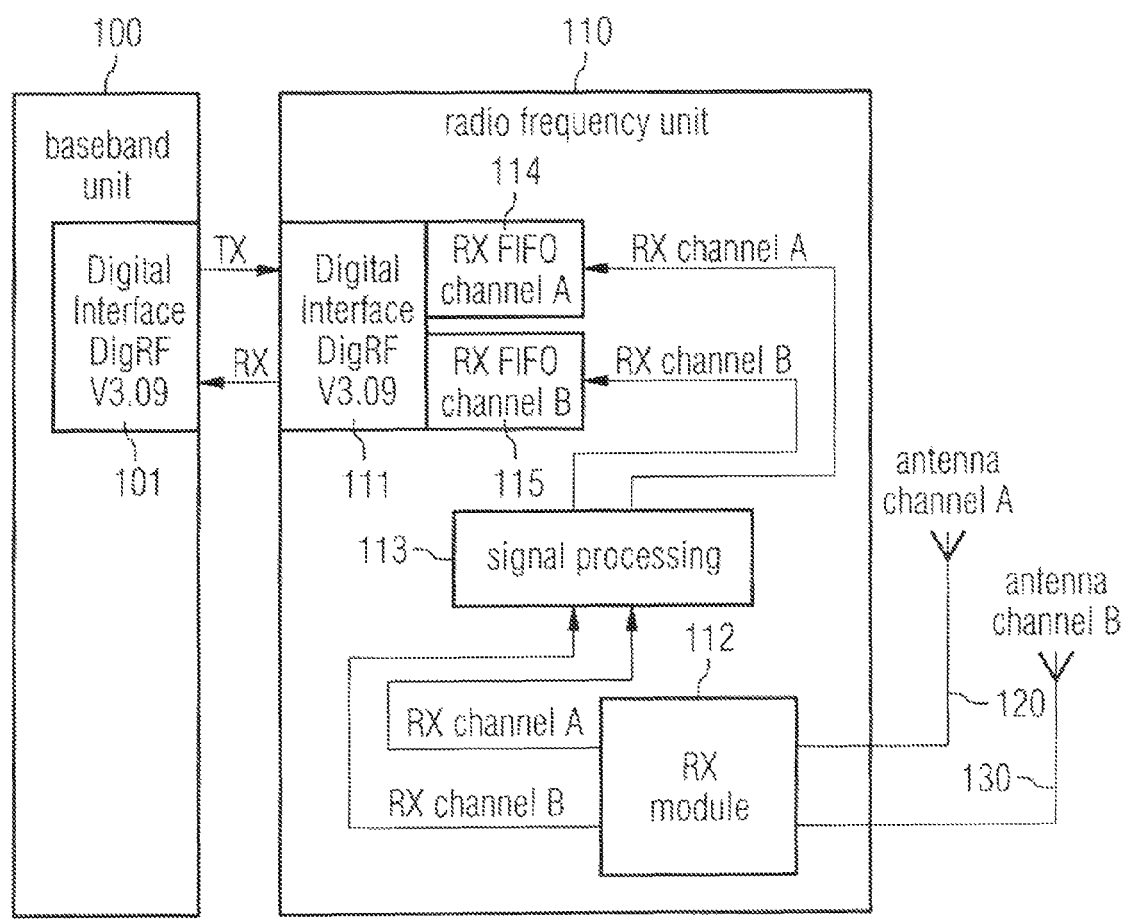
FIG. 1 is an exemplary embodiment of a base band unit and a radio frequency unit.

In the following description further aspects and embodiments of the present invention are disclosed. In addition, reference is made to the accompanying drawings, which form a part hereof, and in which is shown by way of illustration, in which several embodiments of the invention may be practiced. The embodiments of the drawings present examples in order to provide a better understanding of one or more aspects of the present invention. This disclosure is not intended to limit the features or key-elements of the invention to a specific embodiment. Rather, the different elements, aspects and features disclosed in the embodiments can be combined in different ways by a person skilled in the art to achieve one or more advantages of the present invention. It is to be understood that other embodiments may be utilized and structural or logical changes may be made without departing from the scope of the present invention. The elements of the drawing are not necessarily to scale relative to each other. Like reference numerals designate corresponding similar parts.

FIG. 1 shows an exemplary embodiment of a base band unit 100 and a radio frequency unit 110. The radio frequency unit 110 comprises a receiving module 112 which is coupled to a first antenna 120 for a first channel A and to a second antenna 130 for a second channel B. The receiving module 112 is on its output side coupled to a signal processing unit 113, in this embodiment for RX channel A and RX channel B. An output of the signal processing unit 113 is respectively coupled to a first and a second first-in, first-out (FIFO) buffer 114, 115.

The radio frequency unit 110 and the base band unit 100 each comprise a respective digital interface 101, 111 for transmitting data between the base band unit 100 and the radio frequency unit 110. The data stored in the RX buffers 114, 115 can be transmitted via the digital interface 111. Respective portions in the radio frequency unit for processing and transmitting TX data received from the base band unit are not shown in this figure for a better overview.

By using two antennas for receiving radio frequency signals in the radio frequency unit shown in this embodiment a receiving quality can be improved compared to a system comprising a single receiving antenna. The use of more than one antenna can also be called antenna diversity. For processing the radio frequency signals received by the first and the second antenna 120, 130 separate RX channels A and B are provided in this embodiment.

It is not necessary that the signals received by both of the antennas 120, 130 are processed in each case. For example in a first mode of operation only radio frequency signals received from the first antenna 120 for channel A are evaluated. In a second mode of operation the second antenna 130 for channel B can be switched on only, or the radio frequency signals received via the second antenna 130 can be evaluated additional to the radio frequency signal of channel A. A time instant for switching on the receiving of a radio frequency signal from the second antenna 130 can be determined by the base band unit 100.

The radio frequency signals of each of the antennas 120, 130 are processed separately and provided to the RX buffers 114, 115 of the digital interface 111. In the digital interface 111 data frames are generated based on the sampled data stored in the buffers 114, 115 and transmitted to the digital interface 101 of the base band unit 100.

FIG. 2 shows an exemplary frame structure for transmitting data over the digital interface comprising several data frames 21, 22, 23, 24. For example a first sampling data frame 21 which is dedicated to a first logical channel A comprises a plurality of sampling words which are arranged successionally within the sampling data frame 21 for successive time instants nT to (n+15)T. Thereby T is a time period between two succeeding sampling words and n is an arbitrary integer number.

For example each of the sampling words comprises a word length of 16 bits such that a frame size of the sampling data frame 21 is 256 bits. In this embodiment only a payload of the data frame 21 is shown, whereas the data frame 21 can also comprise a respective header section. The header section can for example store information about the dedicated channel, in this case channel A, and/or information about the payload size of the data frame, in this case 256 bits.

The second sampling data frame 22 which is dedicated to a second receiving channel B in this embodiment comprises three void data words which are marked by a capital X. Accordingly, a receiving or evaluating of a radio frequency signal of channel B is turned on beginning with a time instant (n+3)T. As mentioned before, the switching on of the second channel B can be controlled by the base band unit.

The sampling words comprised by the sampling data frames 21, 22 are buffered in the respective FIFO buffers 114, 115 before generating the respective sampling data frames 21, 22. In one embodiment the received sampling words are stored in the FIFO buffers 114, 115, separately for each RX channel, until the number of sampling words stored in the buffers 114, 115 corresponds to the frame size of the sampling data frames 21 to 24. In one embodiment the first sampling data frame 21 dedicated to channel A and the second sampling data frame 22 dedicated to channel B are transmitted to the base band unit via the digital interface immediately one after the other.

As the sampling words for channels A and B are arranged within the sampling data frames such that the sampling words with corresponding time instants are placed at corresponding positions within the data frames, a common continuous time base can be established for the separate logical channels A and B. For example the sampling words can be stored at corresponding positions within the FIFO buffers 114, 115.

Further sampling words dedicated to logical channels A or B respectively, subsequent to the sampling words of data frames 21, 22, can be arranged in further sampling data frames 23, 24 which usually have the same frame size as the preceding data frames 21, 22. To this end, the sampling data frame 23 comprises 16 sampling words dedicated to channel A for time instants (n+16)T to (n+31)T. Accordingly the sampling data frame 24 comprises sampling words dedicated to the second logical channel B for corresponding time instants.

For example, each of the sampling words corresponds to a complex sampling value and comprises an 8 bit portion corresponding to an In-phase component and an 8 bit portion corresponding to a Quadrature component. In other words, sampled I/Q data are comprised in each of the sampling words.

A void value in channel B marked by an capital X in this embodiment may be expressed by a predefined digital value which is recognized as a void value by the base band unit. It is also possible that an actual value of the void data words is irrelevant because a switching on of the second logical channel B is controlled by the base band unit such that the base band unit knows which data words within the data frames can be discarded as being void values.

In one embodiment the sampling data frames 21 to 24 are transmitted over the digital interface such that the base band unit receives a sampling data frame dedicated to channel A and a sampling data frame dedicated to logical channel B in an alternate fashion. An activation or a deactivation respectively of receiving radio frequency signals from the diversity antennas can be performed at the beginning or at the end of a receiving scenario or of a predetermined mode of operation. Alternatively it is possible to switch on or off the second receiving path during a receiving operation. By the time aligned arrangement of the sampling words within the sampling data frames of the first and the second logical channel an additional delay between the receiving paths can be prevented.

It can be easier to process the received sampling data in the base band unit, if a continuous time base can be adhered to. To this end in radio frequency units which are adapted to the UMTS standard, a received UMTS data stream from the radio frequency unit to the base band unit can be continued even if, for example for measurements, it is switched to GSM or EDGE in between. The UMTS data stream can also be transmitted in a so called compressed mode. As also in this case the data words transmitted correspond to a continuous time base, this mode of operation can also be called a continuous time base mode (CTBM).

In a single antenna receiving system data frames can be transmitted via a digital interface, for example the DigRF V3.09 interface, being dedicated to a logical UMTS channel from the radio frequency unit to the base band unit, wherein the data frames carry predefined status data words, for example having the value of 0. As this ensures a continuous time base, these predefined status data words can also be called CTBM words in this case. The number of predefined status data words which are transmitted to the base band unit is evaluated in the base band unit. Therefore it is possible to adhere to the continuous time base of the UMTS data for the time instant when it is switched back to the previous UMTS data transmission for example. Data frames carrying measurement data from a GSM or EDGE mode of operation can be transmitted via the digital interface additional to the data frames carrying the predefined status data words. The GSM or EDGE data frames can have a corresponding dedication in the header section of the respective data frames.

The transmission of CTBM words can also be used in a mode of operation where two or more antennas are employed, also called a diversity mode of operation. In this case it is possible to send data frames via the digital interface carrying predefined status data words dedicated to the respective logical UMTS channel such that CTBM words are transmitted for a first logical channel A and a second logical channel B separately.

The preserving of the continuous time base is independent from a switching on or off of the second channel.

Figure 3:
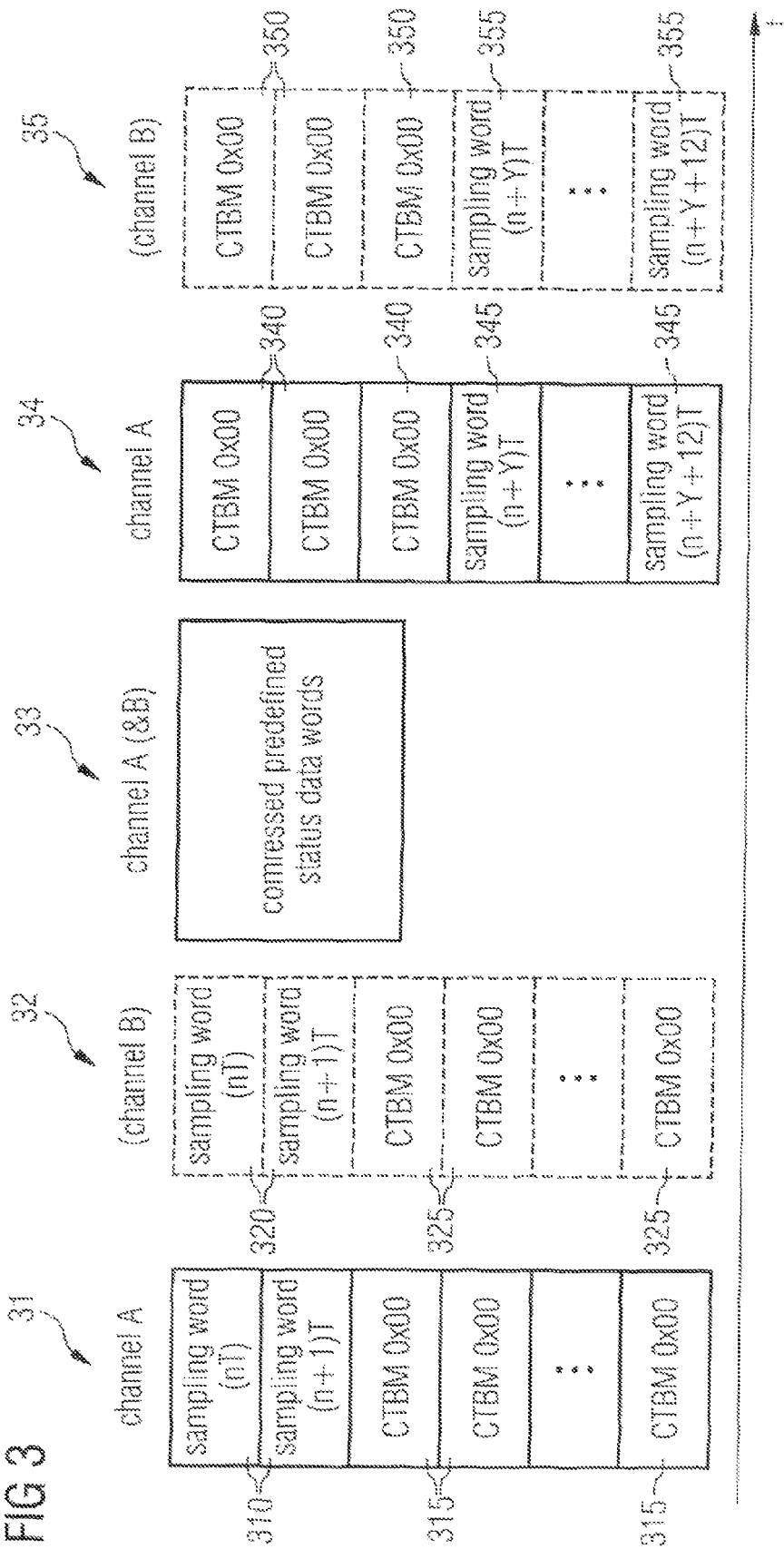
FIG. 3 is a second exemplary embodiment of a frame structure.

FIG. 3 shows an exemplary embodiment of a frame structure for transmitting data over a digital interface for carrying a plurality of predefined status data words corresponding to a continuous time base mode of operation. The frame structure comprises a plurality of data frames 31 to 35. A first sampling data frame 31 comprises at least one sampling word, in this example two sampling words 310. The first sampling data frame is dedicated to a first logical channel A. It further comprises a plurality of predefined status data words 315 for indicating the continuous time base mode of operation.

Accordingly, the frame structure comprises a second sampling data frame 32 following the first sampling data frame 31. The second sampling data frame comprises further sampling words 320 and is dedicated to a second logical channel B. Similar to the first sampling data frame 31 the second sampling data frame 32 comprises a plurality of predefined status data words 325, wherein the number of predefined status data words carried in data frame 32 corresponds to the number of predefined status data words carried in data frame 31.

The frame structure further comprises a set of data frames 33 following the first and the second sampling data frame 31, 32 and carrying therein a compressed form a plurality of predefined status data words dedicated at least to the first logical channel A. As mentioned before, the plurality of predefined status data words corresponds to a continuous time base information for logical channel A and, in one embodiment, for logical channel B.

The frame structure further comprises a first further sampling data frame 34 following the set of data frames 33 which is dedicated to the first logical channel A. In this embodiment it comprises three predefined status data words 340 at the beginning of the sampling data frame 34 and a plurality of sampling words corresponding for example to UMTS sampling data at the end of sampling data frame 34. A second further sampling data frame 35 is dedicated to the logical channel B and has a similar structure as data frame 34 such that it carries a number of predefined status data words 350 and a number of sampling words 355. The indication of time instants (n+Y)T etc. corresponds to the continuous time base, wherein Y denotes that Y-2 predefined status data words are arranged between actual sampling words in this embodiment.

As the plurality of predefined status data words carried by the set of data frames 33 are arranged in the frame structure in a compressed format, a transmission time over the digital interface and a number of data words or data frames can be reduced compared to an uncompressed transmission. Therefore the digital interface can be able to transmit more other data according to a predefined data rate of the digital interface. Furthermore a power consumption of the digital interface can be reduced due to the shorter transmission times especially if the digital interface is used in a battery powered mobile communication system. Therefore a time of operation of the mobile communication device can be increased.

In one embodiment, the number of predefined status data words transmitted in the set of data frames 33 can be evaluated within the base band unit together with the predefined status data words transmitted in the sampling data frames 31, 32 before and/or the sampling data frames 34, 35 transmitted after the set of data frames 33. Accordingly, the base band unit can adhere to the continuous time base when processing the sampling words 345, 355.

The number of sampling words in the sampling data frame 31, 32 before the set of data frames 33 can be varied, depending on a time instant when it is switched to a continuous time base mode of operation. For example each of the sampling data frames 31, 32 can carry a single sampling word, wherein the rest of the data frames 31, 32 is filled with predefined status data words, or can be filled thoroughly with sampling words such that the sampling data frames 31, 32 carry no predefined status data words. In other words, the first and the second sampling data frames 31, 32 comprise at least one sampling word.

Accordingly, the sampling data frames 34, 35 following the set of data frames 33 can each comprise a single sampling word arranged at the respective end of the data frame 34, 35, wherein at the beginning of the data frame 34, 35 is filled with predefined status data words. It is also possible that the sampling data frames 34, 35 only comprise sampling words such that no predefined status data words are comprised by the data frame 34, 35. Therefore also the first and the second further sampling data frame 34, 35 each comprise at least one sampling word.

The embodiment described above relates to a diversity mode of operation employing a first and a second logical channel A and B. In a further embodiment, for a single antenna mode of operation the respective data frames for a logical channel B, namely sampling data frames 32, 35 can be omitted, wherein in this case the predefined status data words carried by the set of data frames 33 in a compressed format are dedicated solely to the logical channel A. The possible omission of data frames dedicated to logical channel B is indicated in FIG. 3 by the dotted sampling data frames 32, 35.

Figure 4:
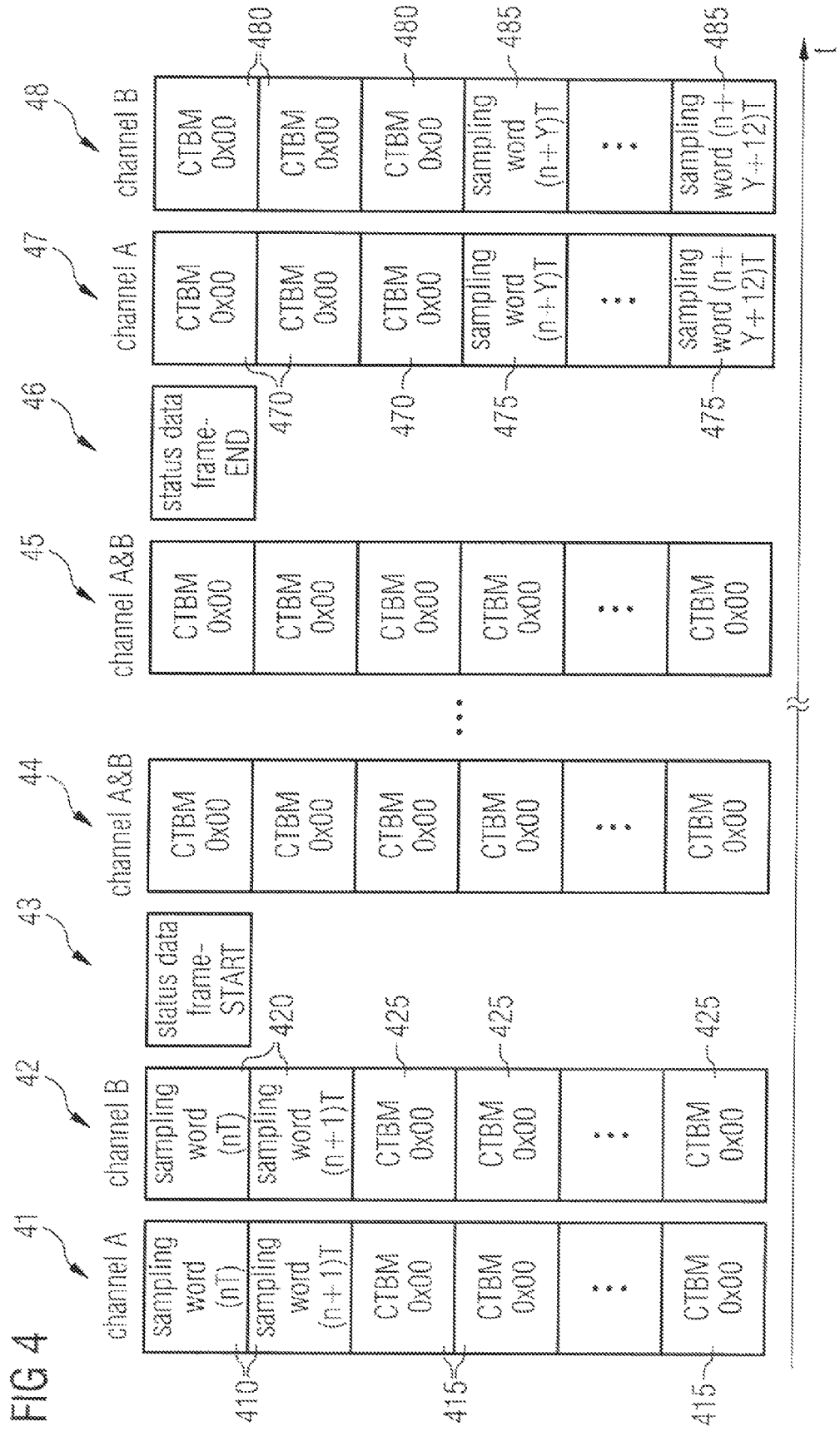
FIG. 4 is a third exemplary embodiment of a frame structure.

FIG. 4 shows another embodiment of a frame structure for transmitting data over a digital interface. The frame structure comprises several data frames 41 to 48. In this embodiment the sampling data frames 41, 42 correspond to sampling data frames 31, 32 shown in the embodiment of FIG. 3. Furthermore the sampling data frames 47, 48 correspond to sampling data frames 34, 35. Accordingly, the sampling data frames 41, 42, 47, 48 comprise sampling words 410, 420, 475, 485 which in one embodiment correspond to UMTS data received over a first and a second antenna in a diversity mode of operation. The sampling data frames 41, 42, 47, 48 further comprise predefined status data words 415, 425, 470, 480 for holding up a continuous time base.

The frame structure of FIG. 4 comprises a set of data frames 43 to 46 arranged between the second sampling data frame 42 and the first further sampling data frame 47. The set of data frames carries in a compressed format a plurality of predefined status data words dedicated to the first and the second logical channel A, B. To this end the set of data frames comprises a first status data frame 43 indicating the beginning of the plurality of predefined status data words and a second status data frame 46 indicating an end of the plurality of the predefined status data words. The set of data frames further comprises data frames 44 to 45, each carrying thoroughly predefined status data words, indicated by CTBM in the Figures. In this case, the predefined status data words carried in the data frames 44, 45 are dedicated to both the first and the second logical channel A and B. According to how long the continuous time base mode of operation is active, a respective number of data frames similar to data frames 44, 45 can be arranged between the first and the second status data frame 43, 46. For example, it is also possible that only the data frame 44 is present in the frame structure, if only such a small number of predefined status data words has to be transmitted over the digital interface.

In one embodiment, the continuous time base information comprised by the set of data frames 43 to 46 can be evaluated in the base band unit receiving the frame structure. As the continuous time base information is dedicated to both the first and the second logical channel A and B, only about the half of data has to be arranged in the frame structure compared to transmitting the continuous time base information for each of the channels A and B separately. The first and the second status data frame 43, 46, corresponding to the beginning and an end of the continuous time base information respectively are evaluated by the receiving part of the digital interface to this end.

Figure 5:
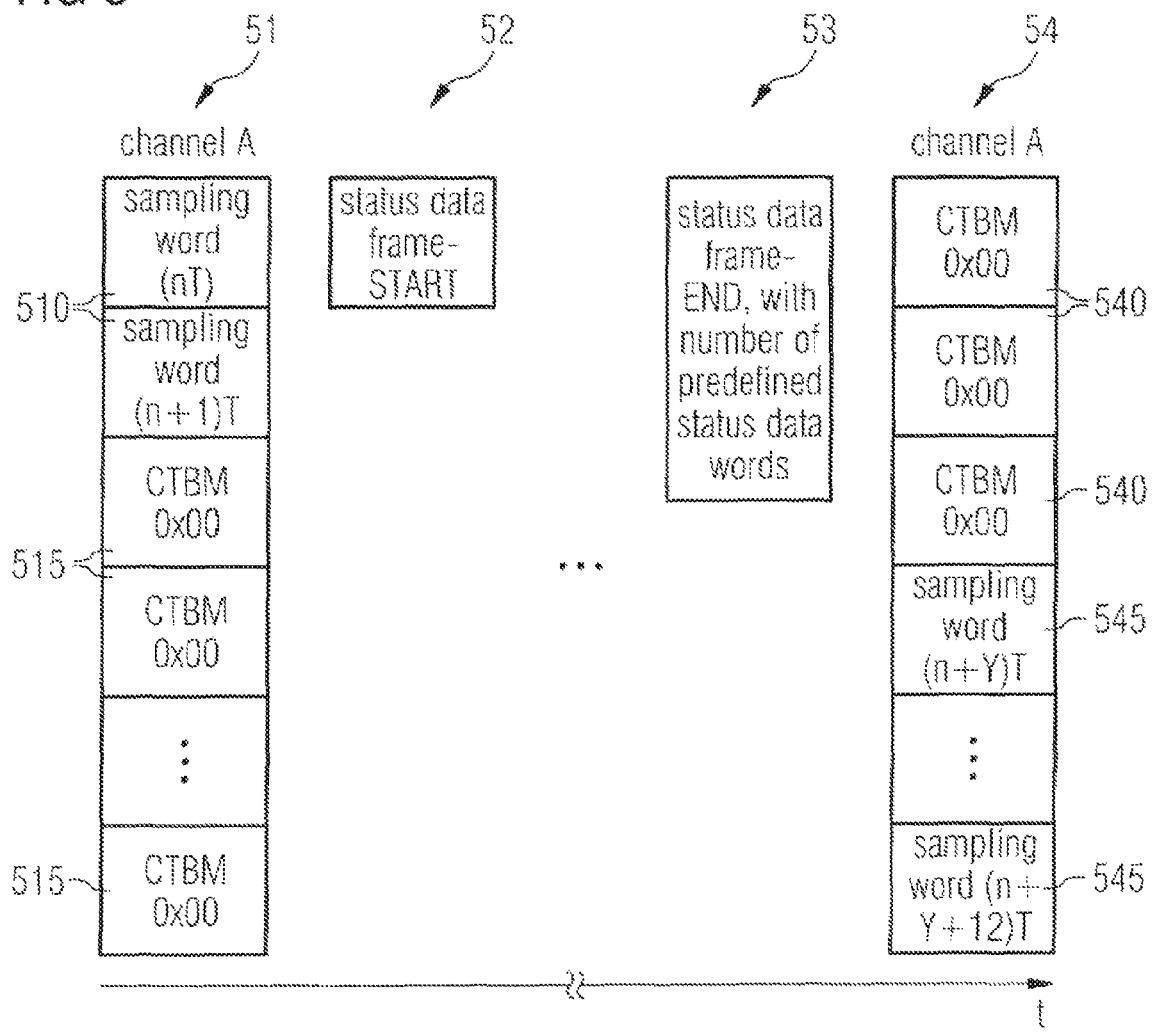
FIG. 5 is a fourth exemplary embodiment of a frame structure.

FIG. 5 shows another embodiment of a frame structure for transmitting data of a digital interface. It comprises a sampling data frame 51 carrying sampling words 510 and predefined status data words 515 and a further sampling data frame 54 carrying predefined status data words 540 and sampling words 545. Both the sampling data frame 51 and the further sampling data frame 54 are dedicated to a single logical channel A, for example corresponding to a single antenna mode of operation.

The frame structure further comprises a first status data frame 52 indicating a beginning of a plurality of predefined status data words and a second status data frame 53 indicating an end of the plurality of predefined status data words, wherein the second status data frame carries information about a quantity of the plurality of predefined status data words. In other words the frame structure comprises a set of data frames which in this case comprise the first and the second status data frame which carry in a compressed format the plurality of predefined status data words. It is not necessary to arrange data frames actually carrying predefined status data words, as the status data frames 52, 53 indicate a specific number of the predefined status data words which can be evaluated by the receiving section of the digital interface for example, no data or no electrical signals are necessarily transmitted over the digital interface between the first and the second status data frame 52, 53 which improves the power consumption of the digital interface. Status data frames 52, 53 can also carry the information that the predefined status data words for holding up the continuous time base are dedicated to the logical channel A, for example in a header section of the status data frames which is not shown in this Figure.

When using the frame structure shown in FIG. 5 with a DigRF V3.09 interface for example, the base band unit as a receiving section of the digital interface can internally generate a respective number of samples corresponding to the continuous time base information transmitted within the status data frames 52, 53.

Figure 6:
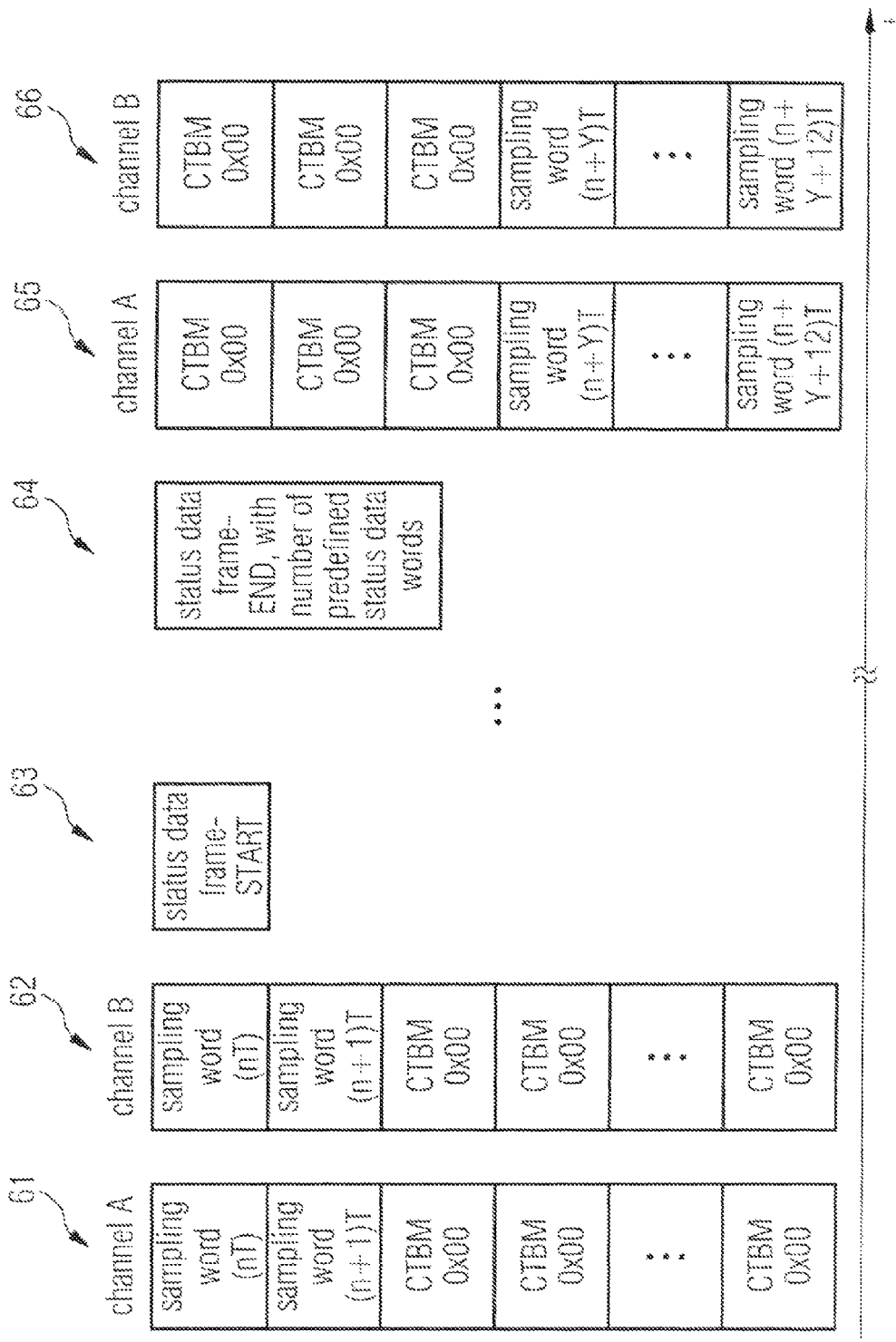
FIG. 6 is a fifth exemplary embodiment of a frame structure.

FIG. 6 shows another embodiment of a frame structure which is similar to the embodiment shown in FIG. 5. The frame structure comprises a first and the second sampling data frame 61, 62 dedicated to a logical channel A and a logical channel B respectively, and a first and a second further sampling data frame 65, 66, also being dedicated to the logical channels A and B respectively. The frame structure further comprises a first and a second status data frame 63, 64 indicating the beginning and an end of the plurality of predefined status data words, as well as a number of the plurality of predefined status data words which the status data frames 63, 64 stand for.

The plurality of predefined status data words carried by the status data frames 63, 64 in a compressed format are dedicated to both the first and the second logical channel A and B in this embodiment. Therefore, as in the embodiment shown in FIG. 5, also in this embodiment it is not necessary to actually send further data frames with predefined status data words between the first and the second status data frame 63, 64.

As indicated by the pictured size of the status data frames 43, 46, 52, 53, 63, 64 in FIGS. 4, 5 and 6, a frame size or payload size of the respective status data frames can be smaller than the frame size or payload size of the sampling data frames which further reduces a transmission time over the digital interface and the corresponding power consumption. In one embodiment, the status data frames only carry information about the type of status data frame in their payload section or, in the respective cases, a value corresponding to the number of predefined status data words indicated by the status data frames.

Figure 7:
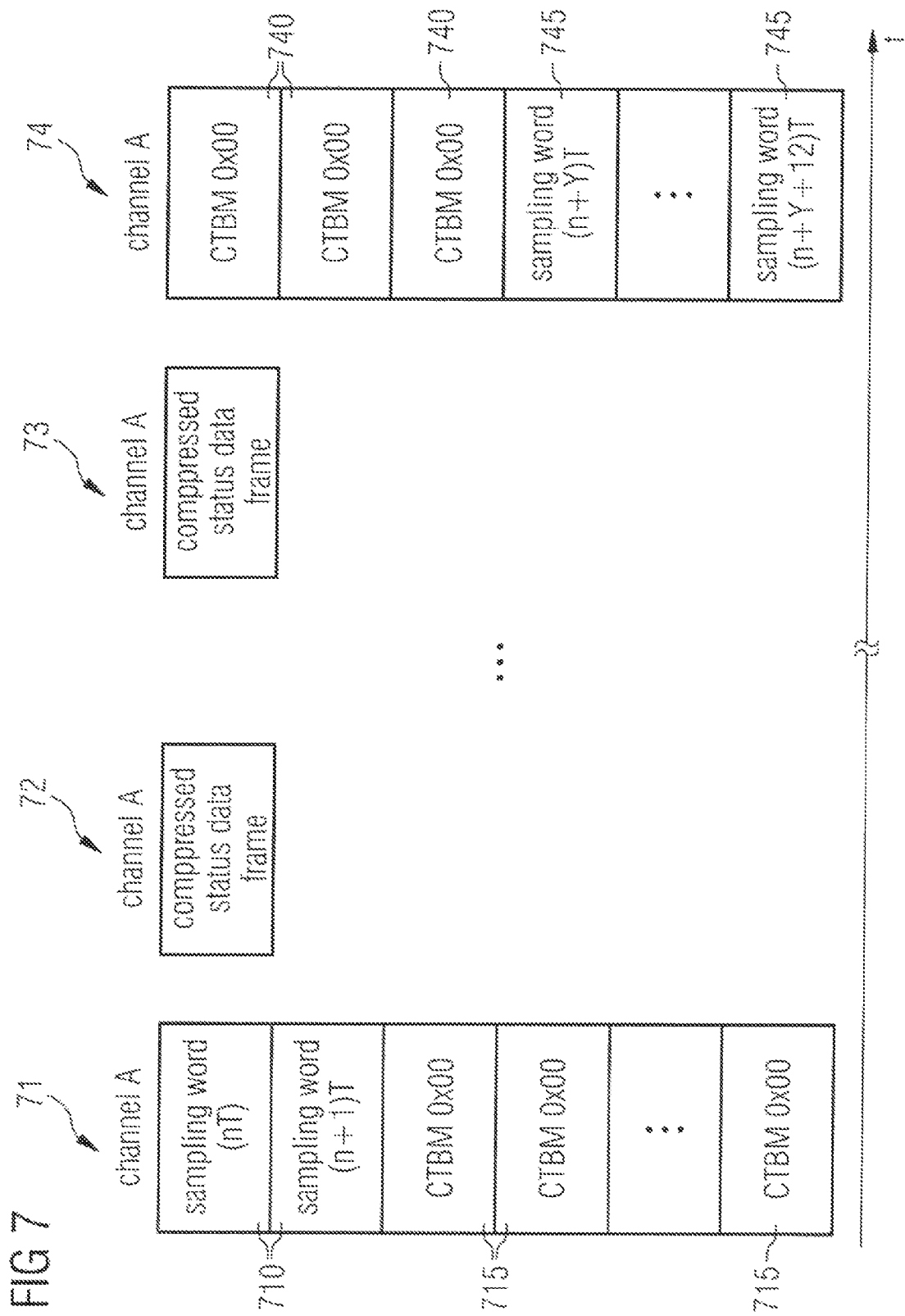
FIG. 7 is a sixth exemplary embodiment of a frame structure.

FIG. 7 shows another embodiment of a frame structure for transmitting data over a digital interface comprising sampling data frames 71, 74 with sampling words 710, 745 and predefined status data words 715, 740, each dedicated to a first logical channel A. The frame structure further comprises a set of data frames 72, 73 comprising several compressed status data frames.

The first sampling data frame 71 and the first further sampling data frame 74 have a first frame size. The compressed status data frames have a second frame size which is smaller then the first frame size. Each of the compressed status data frames 72, 73 carries in a compressed format a predefined number of predefined status data words corresponding to a continuous time base information, wherein the number of predefined status data words in one embodiment corresponds to a number of predefined status data words which can be carried by a sampling data frame of the first size. Therefore it is possible to transmit only a smaller data frame over the digital interface, thus saving transmission time and reducing power consumption.

Similarly to the previous embodiments, an actual number of compressed status data frames depends on a duration of a mode of operation in which the predefined status data words or continuous time base information has to be transmitted. In one embodiment only a single compressed status data frame is arranged between the first sampling data frame 71 and the first further sampling data frame 74, such that a set of data frames arranged between the sampling data frames 71, 74 comprise at least one compressed status data frame.

In another embodiment a frame structure for transmitting data over a digital interface comprises a first sampling data packet 71 having a first packet size and comprising at least one sampling word 710 to be transmitted over a first logical channel A, at least one compressed status data packet 72, 73 following the first sampling data packet 71, having a second packet size being smaller than the first packet size and carrying in a compressed format a plurality of predefined status data words dedicated at least to the first logical channel A. The frame structure further comprises a first further sampling data packet 74 following the at least one compressed status data packet 72, 73, having the first packet size and comprising at least one sampling word 745 to be transmitted over the first logical channel A. Also in this case the plurality of predefined status data words can correspond to a continuous time base information.

Figure 8:
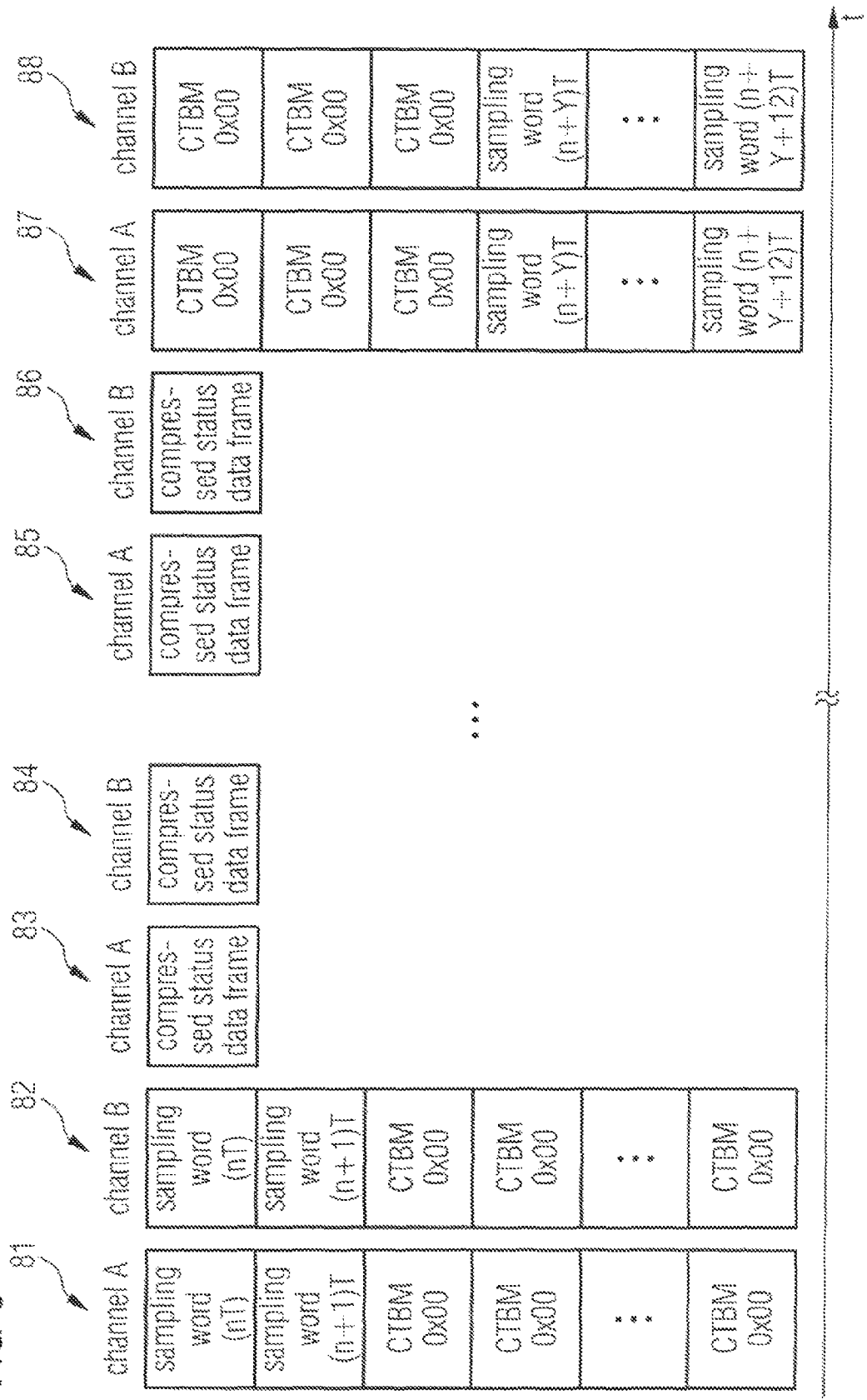
FIG. 8 is a seventh exemplary embodiment of a frame structure.

FIG. 8 shows another frame structure for transmitting data over a digital interface which in this embodiment comprises a first and a second sampling data frame or a sampling data packet 81, 82, a first and a second further sampling data frame or sampling data packet 87, 88 and a plurality of compressed status data frames or compressed status data packets arranged between the sampling data packets 81, 82 and the sampling data packets 87, 88. The sampling data packets 81, 82, 87, 88 have a first packet size and the compressed status data packets 83 to 86 have a second packet size which is smaller than the first packet size.

The first sampling data packet 81 and the first further sampling data packet 87 are dedicated to a first logical channel A, whereas the second sampling data packet 82 and the second further sampling data packet 88 are dedicated to a second logical channel B. Accordingly, the frame structure shown in FIG. 8 can be used in a diversity antenna mode of operation.

The compressed status data frames 83 to 86 are alternately dedicated to the first logical channel A and the second logical channel B such that the compressed status data frames 83, 85 are dedicated to the logical channel A and the compressed status data frames 84, 86 are dedicated to the second logical channel B. As the second packet size is smaller than the first packet size, transmission time and power consumption can be reduced similar to the embodiment shown in FIG. 7. A respective packet size of the data packet 81 to 88 is for example indicated in a respective header section of the data packets 81 to 88.

Figure 9:
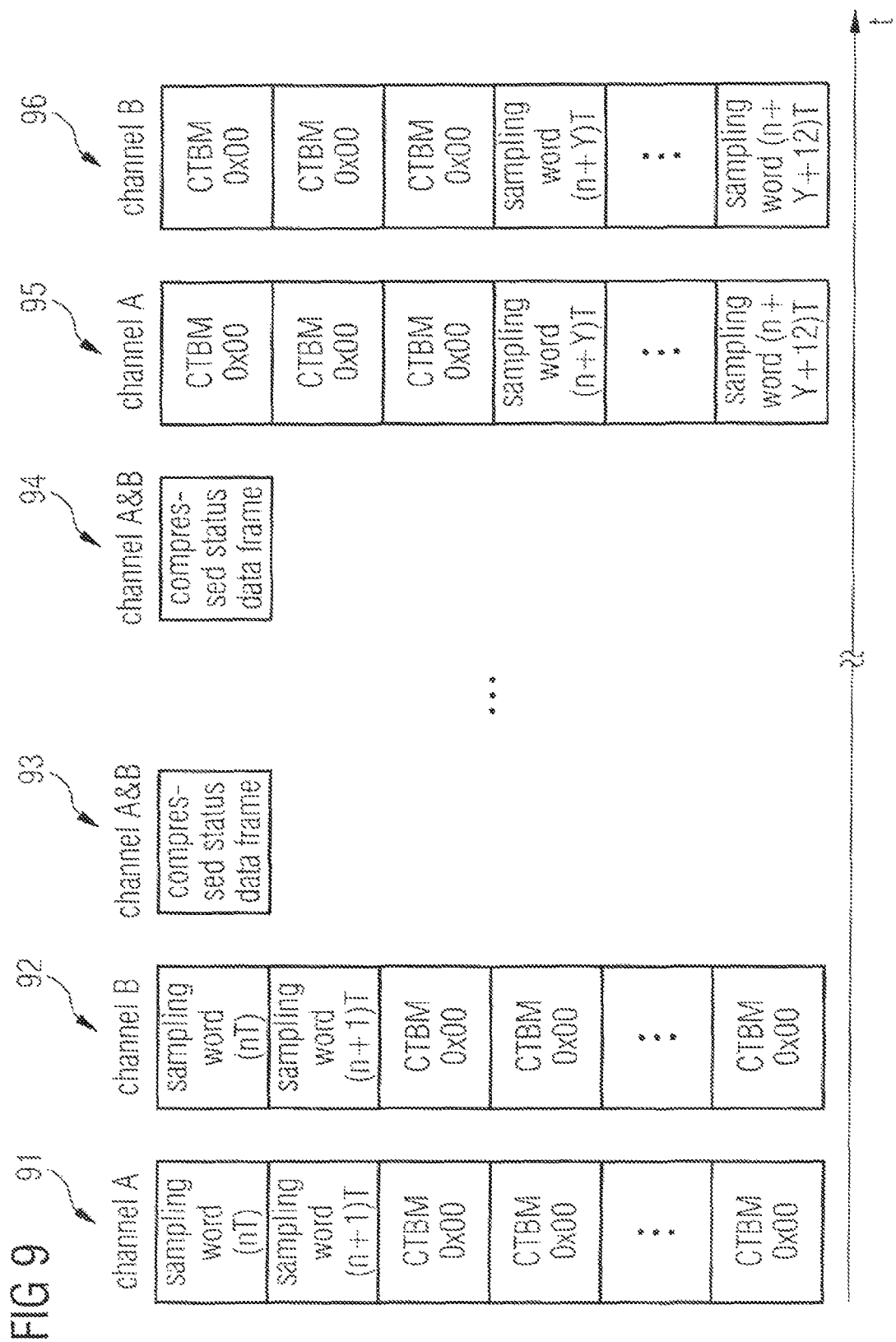
FIG. 9 is an eighth exemplary embodiment of a frame structure.

In another embodiment, shown in FIG. 9, the frame structure comprises sampling data packets 91, 92, 95, 96 which correspond to sampling data packets 81, 82, 87, 88 of the embodiment shown in FIG. 8 and comprise as well sampling words as predefined status data words. The frame structure of FIG. 9 further comprises compressed status data frames or compressed status data packets 93, 94 which are arranged between sampling data packets 91, 92 and the sampling data packets 95, 96 and are each dedicated to both the first and the second logical channel A and B. The compressed status data packets 93, 94 each carry in a compressed format a plurality of predefined status data words, which in this case are dedicated to the first and to the second logical channel.

Accordingly, in a diversity antenna mode of operation, a continuous time base can be held up using the continuous time base information comprised in a compressed status data frames 93, 94. Similar to the previous embodiments, a transmission time and a power consumption over the digital interface over which the frame structure is transmitted can be reduced.

In each of the embodiments shown in FIGS. 7, 8 and 9 each of the sampling data packets and the status data packets comprises a header section and payload section. A dedication to the first and/or the second logical channel is determined in a respective header section of the packets and sampling words or status data words are carried in a respective payload section of the packets. Furthermore for each of the status data packets and the sampling data packets a size of a respective payload section or a first and/or a second packet size are determined in the respective header section of the respective data packet.

For example, each of the sampling data packets can have a payload size of 256 bit with which 16 sampling words with a word length of 16 bits may be transmitted. As mentioned before, the payload size of 256 bits may be stored in the respective header sections of the sampling data packets. For the compressed status data packets a packet size of 16 bits can be defined in its respective header section. The receiving section of the digital interface over which the frame structure is transmitted can evaluate the data packets and, in one embodiment, the header section of the data packets. If the receiving section which may be a base band unit recognizes the payload size of 16 bits and a dedication to the first and/or to the second logical channel, it can generate a respective number of predefined status data words corresponding to the compressed status data packet. For example, in one embodiment, one compressed status data packet corresponds to 16 predefined status data words which can be written to the respective input buffer of the base band unit for the respective logical channel(s). The payload size of the status data packets can also be greater than 16 bits but should be smaller than a payload size which can be used for an actual data transmission. This can be for example the case for a data transmission of respective UMTS data, wherein the frame structure is used for a digital interface according to the DigRF V3.09 standard. The data stored in the input buffers can be processed by respective signal processing means within the base band unit.

If the system where the digital interface is used is in a diversity mode of operation, a dedication to both the first and the second logical channel A and B shown in FIG. 9 can be expressed by the respective header section. The dedication to the second logical channel can be assumed in one embodiment by the receiving section or base band unit automatically as knowing of the diversity antenna mode of operation.

Assuming a header size of 24 bits, a total frame size or packet size of each of the data packets can be reduced from 280 bits including header section and 256 bits payload section to a total size of 32 bits, wherein in this case the payload size results to 8 bits. Using one of the embodiments of a frame structure with a digital interface according to the DigRF V3.09 standard, a data rate during the transmission of predefined status data words or CTBM packets in a diversity antenna mode of operation can be reduced from 134.4 Mbit/s to 15.36 Mbit/s for example. The remaining data rate can be used for other transmissions during the continuous time base mode of operation, for example for a diversity antenna mode of operation of GSM/EDGE (2.5G) or 2G data.

The various embodiments of a frame structure for transmitting data over a digital interface can also be used for other digital interfaces and also in the direction the base band unit to a radio frequency unit.

When using a digital interface according to the DigRF V3.09 standard, the frame structure can be used as well for received sampling data in a receiving path as for other status information or data which are transmitted on command of the base band unit. If a transmission has begun via the interface, a waiting next transmission has to wait until the preceding transmission has finished, since a running transmission cannot be interrupted. Therefore it can be prevented to send status information or other control data over the digital interface between a transmission of data dedicated to the first logical channel A and the second logical channel B. This avoids an additional delay of the second logical channel B. The status information or other control data can be buffered and sent to the base band unit after the transmission of the data frame dedicated to the second logical channel B has finished.

Figure 10:
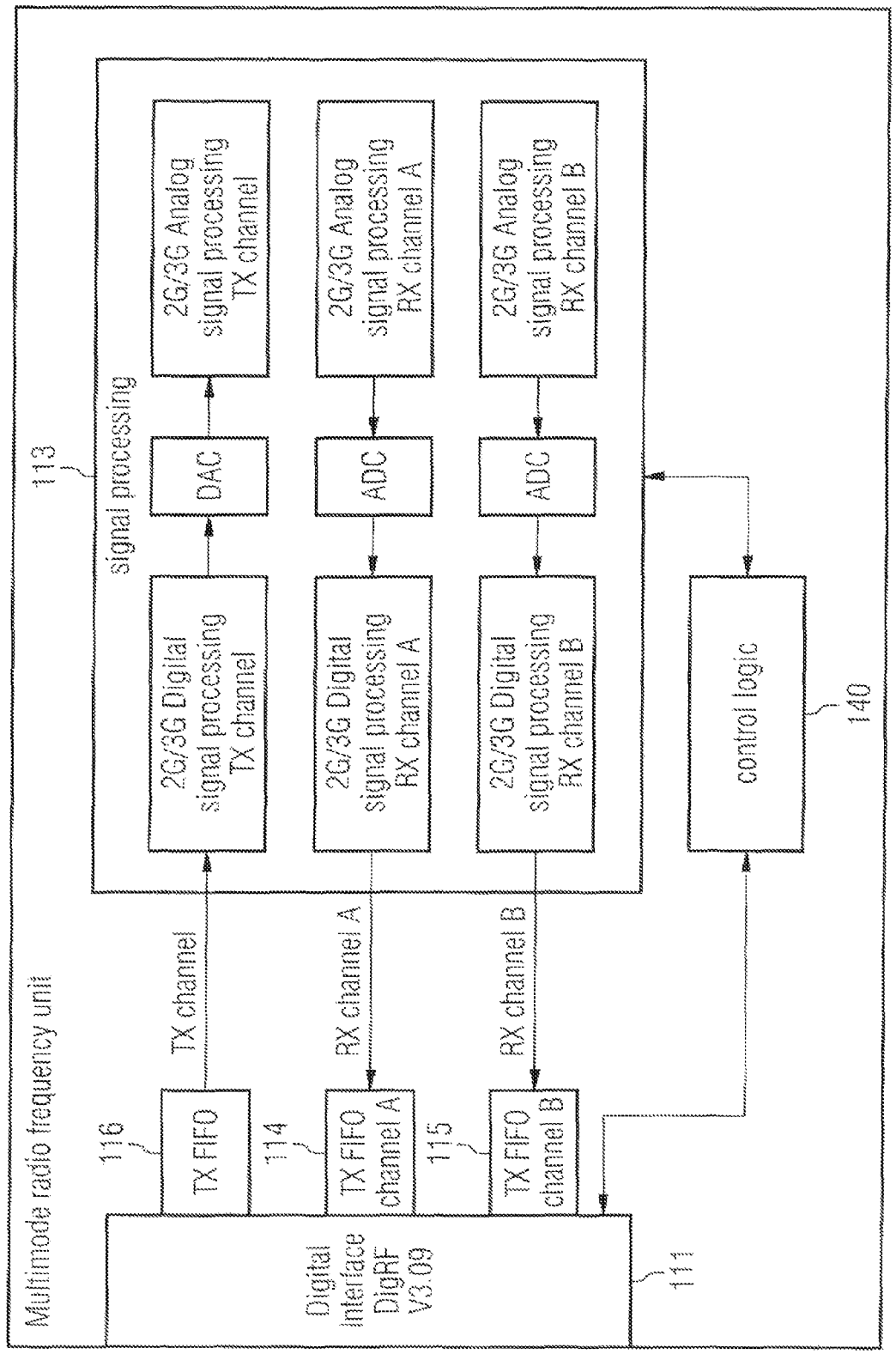
FIG. 10 is an exemplary embodiment of a radio frequency unit.

FIG. 10 shows an exemplary embodiment of a multi mode radio frequency unit 110 which can be used for sending and receiving radio frequency signals according to both a 2G and a 3G mobile communication standard. It comprises a control logic 140 which is coupled to a digital interface 111 and to a signal processing unit 113. The digital interface 111 comprises a first and a second input buffer for a first and a second RX channel A, B and an output buffer 116 for data to be transmitted as a radio frequency signal. In one embodiment, the buffers 114, 115, 116 are FIFO buffers. The signal processing unit 113 comprises respective blocks for 2G/3G analogue signal processing for RX channels A and B, analogue to digital converters ADC and the respective digital signal processing blocks for 2G/3G RX channels A and B. The signal processing unit 113 further comprises the digital signal processing block for the TX channel for processing the TX data transmitted from the TX buffer 116 via a TX channel. On the output side of that digital signal processing block for the TX channel is a digital to analogue converter DAC and an analogue signal processing block for the TX channel.

The control logic 140 can receive control commands via the digital interface 111 and control the function of the signal processing blocks in the signal processing unit 113 accordingly. Furthermore status and/or control information from the signal processing blocks can be provided to the digital interface via the control logic.

In one embodiment, the control logic 140 controls a 2G and/or 3G mode of operation within the signal processing unit 113. In the case that no payload data can be received from the first and the second RX path because of an actual mode of operation, the control logic 140 can perform the respective control settings to hold a continuous time base up. The digital interface 111 can generate data frames or data packets according to one of the embodiments of FIGS. 3 to 9 which can be evaluated by a respective base band unit to achieve a time continuous data stream. It is nevertheless possible to process 2G RX data in this case which can be transmitted over the digital interface 111 together with the continuous time base information in separate data frames or data packets, always having in mind that the digital interface 111 can be a serial interface according to the DigRF V3.09 standard.

Figure 11:
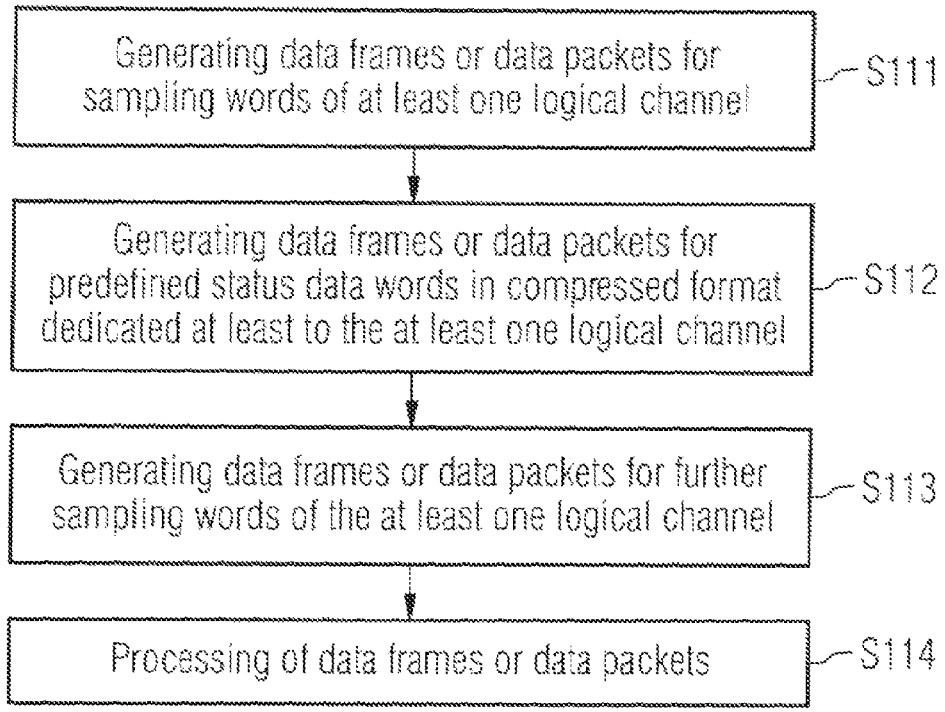
FIG. 11 is a flow chart diagram of an organizing method.

FIG. 11 shows an exemplary flow chart diagram illustrating a method for organizing data to be transmitted over a digital interface in one embodiment. The method can for example be used in a system according to the embodiment shown in FIG. 1 or the embodiment shown in FIG. 10. While the method and other methods of the invention are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated actions may be required to implement a methodology in accordance with the invention.

At S111 a first sampling data frame based on at least one sampling word is generated, whereby the first sampling data frame is dedicated to a first logical channel. In case that not only data from a single antenna mode of operation but also from a diversity antenna mode of operation are available, also a second sampling data frame can be generated being based on at least one second sampling word and being dedicated to a second logical channel.

At S112 a set of data frames is generated following the first sampling data frame and, in case of a diversity antenna mode of operation the second sampling data frame is generated such that a set of data frames carries in a compressed format a plurality of predefined status data words dedicated at least to the first logical channel. In the diversity mode of operation the plurality of predefined status data words can also be dedicated to the second logical channel. In one embodiment the plurality of predefined status data words corresponds to a continuous time base information.

At S113 a first further sampling data frame being based on at least one further sampling word can be generated which follows the set of data frames generated at S112. The first further sampling data frame is dedicated to the first logical channel. In case of a diversity mode of operation a second further sampling data frame following the first further sampling data frame can be generated, wherein the second further sampling data frame is based on at least one further second sampling word and dedicated to the second logical channel.

At S114 the data frames which are generated at S111, S112 and S113 are processed which can comprise an ordering of the respective data frames and also a transmission of the generated data frames over the digital interface.

In one embodiment, at S112 the set of data frames is generated such that it comprises a first status data frame indicating the beginning of the plurality of predefined status data words and a second status data frame indicating an end of the plurality of predefined status data words. Furthermore the set of data frames comprises at least one data frame being arranged between the first status data frame and the second status data frame and carries a predefined number of predefined status data words being dedicated to the first and to the second logical channel in the case of a diversity antenna mode of operation.

In another embodiment, at S112 the set of data frames is generated such that a first status data frame indicates the beginning of the plurality of predefined status data words and a second status data frame indicates an end of the plurality of predefined status data words wherein the second status data frame carries information about a quantity of the plurality of predefined status data words. This embodiment can be used as well for a single antenna mode of operation as for a diversity antenna mode of operation.

In another embodiment a first sampling data frame and the first further sampling data frame have a first frame size and the set of data frames generated at S112 comprises at least one compressed status data frame having a second frame size being smaller than the first frame size. Thereby the at least one compressed status data frame carries in a compressed format a plurality of predefined status data words dedicated to the first logical channel in a single antenna mode of operation. In an embodiment for a diversity antenna mode of operation the set of data frames can be generated such that it comprises at least one further compressed status data frame having the second frame size. In this case the at least one further compressed status data frame carries in a compressed format a plurality of predefined status data words dedicated to the second logical channel. In another embodiment for a diversity antenna mode of operation the at least one compressed status data frame is generated at S112 such that it carries in a compressed format a plurality of predefined status data words dedicated to the first and the second logical channel.

With the embodiments described for FIG. 11 it is possible to reduce the effort for the transmission of data over a digital interface because data which can be used to hold up a continuous time base can be transmitted efficiently in a compressed format over the digital interface. For example these embodiments can be used with a digital interface according to the DigRF V3.09 standard.

Figure 12:
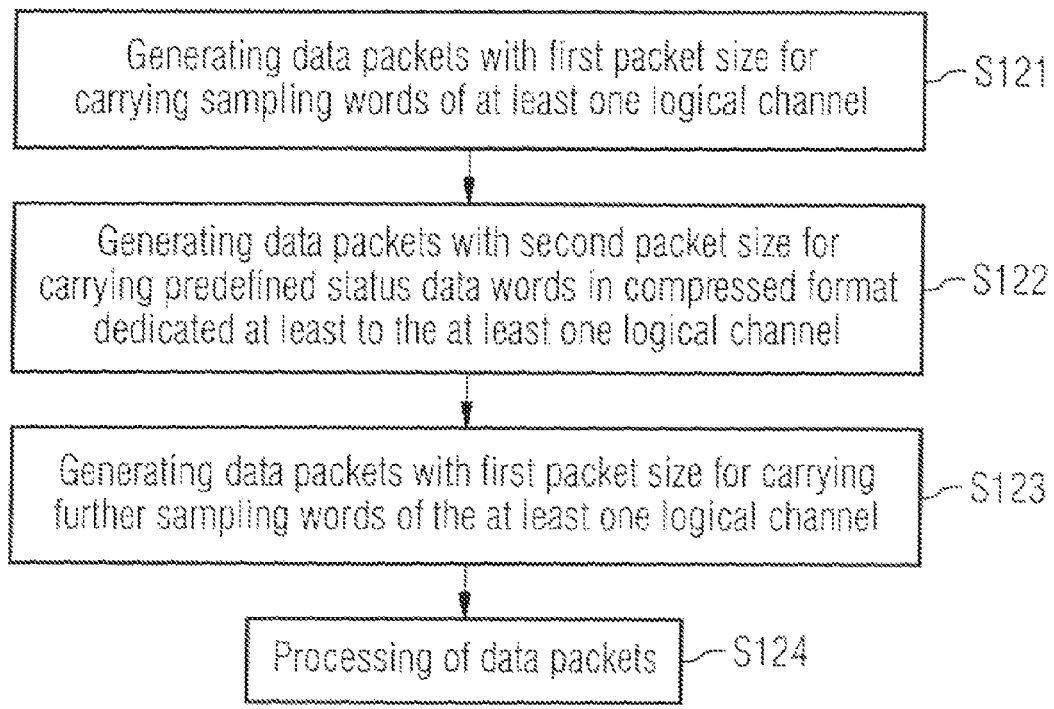
FIG. 12 is a second exemplary flow chart diagram of an organizing method.

FIG. 12 shows another exemplary flow chart diagram illustrating a method for organizing data to be transmitted over a digital interface. At S121 a first sampling data packet based on at least one sampling word to be transmitted over a first logical channel is generated, wherein the first sampling data packet has a first packet size. For a diversity antenna mode of operation a second sampling data packet being based on at least one second sampling words to be transmitted over a second logical channel is generated, wherein the second sampling data packet can also have the first packet size. At S122 at least one compressed status data packet is generated, following the first sampling data packet and, if available, the second sampling data packet, wherein the compressed status data packet has a second packet size being smaller than the first packet size and carries in a compressed format a plurality of predefined status data words dedicated at least to the first logical channel. In a diversity antenna mode of operation in one embodiment at least one compressed status data packet carries in a compressed format a plurality of predefined status data words dedicated to the first and to the second logical channel. In another embodiment for a diversity antenna mode of operation at least one further compressed status data packet having a second packet size and being arranged after the at least one compressed status data packet is generated, wherein the at least one further compressed status data packet carries in a compressed format a plurality of predefined status data words dedicated to the second logical channel.

At S123 a first further sampling data packet is generated based on at least one further sampling word to be transmitted over the first logical channel, wherein the first further sampling data packet follows the at least one compressed status data packet and, if available the at least one further compressed status data packet. The first further sampling data packet has the first packet size. In a diversity antenna mode of operation additionally a second further sampling data packet following the first further sampling data packet is generated which is based on at least one second further sampling word to be transmitted over the second logical channel. Also the second further sampling data packet have the first packet size.

At S124 the data packets are further processed, for example transmitted over the digital interface.

In one embodiment a quantity of the predefined status data words carried by the at least one compressed status data packet in a compressed format corresponds to a quantity of sampling words that can be carried by a sampling data packet of the first size.

In another embodiment each of the status data packets and the sampling data packets comprises a header section and payload section. A dedication to the first and/or to the second logical channel is determined in a respective header section of the data packets and sampling words or status data words are carried in a respective payload section of the data packets. For example for each of the status data packets and the sampling data packets the size of a respective payload section or a size of a first and/or a second packet size are determined in a respective header section of the respective data packets.

In an embodiment of a method for transmitting data over a digital interface sampling data frames comprising at least one sampling word to be transmitted over the digital interface are transmitted, wherein the sampling data frames are dedicated to a first logical channel and bearing reference to a continuous time base of the first logical channel. Furthermore a plurality of predefined status data words are transmitted in a compressed format which are dedicated at least to the first logical channel and adapted to maintain the continuous time base of the first logical channel during a time period in which no sampling words being dedicated to the first logical channel or to be transmitted. Therefore by transmitting the plurality of predefined status data words a continuous time base of a logical channel can be held up.

In another embodiment additionally further sampling data frames are transmitted comprising at least one further sampling word and being dedicated to a second logical channel, wherein the plurality of predefined status data words are further dedicated to the second logical channel. With this embodiment a continuous time base can be held up also for the case of a diversity antenna mode of operation.

A time period in which no sampling words being dedicated to a logical channel are to be transmitted can be a time period in which monitoring of other frequencies in a radio frequency unit can be performed. Furthermore in that time period a frequency generator or phase-locked loop can be its initial state in which a desired frequency cannot be guaranteed such that no data can be processed which are received from an antenna.

The various embodiments described before can also be used with other digital interfaces than the interface according to DigRF V3.09. Furthermore the embodiments are not limited to a transmission of data from a radio frequency unit to a base band unit, but can also be used for the other direction.

Although specific embodiments have been illustrated and described herein, it will be appreciated by those of ordinary skill in the art, that any arrangement which is calculated to achieve the same purpose may be substituted for the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention should, therefore, be determined with reference to the appended claims along with the scope of equivalents to which such claims are entitled.

It is emphasized that the Abstract is provided to comply with 37 C.F.R. section 1.72(b) requiring an abstract that will allow the reader to quickly ascertain the nature and gist of the technical disclosure. It is submitted with the understanding, that it will not be used to interpret or limit the scope or meaning of the claims.

The invention claimed is:

1. A communication unit comprising:
    a one or more buffers configured to store a plurality of sampling data frames; and
    an interface configured to receive the plurality of sampling data frames from the one or more buffers and to generate a frame structure for transmitting data over a digital interface, the frame structure comprising:
        a first sampling data frame comprising at least one sampling word, wherein the first sampling data frame is dedicated to a first logical channel;
        a set of data frames following the first sampling data frame, the set of data frames comprising, in a compressed format, a plurality of predefined status data words dedicated at least to the first logical channel; and
        a first further sampling data frame following the set of data frames and comprising at least one further sampling word, wherein the first further sampling data frame is dedicated to the first logical channel.

2. The communication unit of claim 1, wherein the plurality of predefined status data words corresponds to a continuous time base information.

3. The communication unit of claim 1, wherein the set of data frames comprises: a first status data frame indicating a beginning of the plurality of predefined status data words; and a second status data frame indicating an end of the plurality of predefined status data words.

4. The communication unit of claim 3, wherein the second status data frame comprises information about a quantity of the plurality of predefined status data words.

5. The communication unit of claim 3, further comprising: a second sampling data frame arranged between the first sampling data frame and the set of data frames, the second sampling data frame comprising at least one second sampling word dedicated to a second logical channel; a second further sampling data frame following the first further sampling data frame, the second further sampling data frame comprising at least one second further sampling word dedicated to the second logical channel; and wherein the set of data frames comprises at least one data frame arranged between the first status data frame and the second status data frame and comprising a predefined number of predefined status data words dedicated to the first and second logical channels.

6. The communication unit of claim 3, further comprising: a second sampling data frame arranged between the first sampling data frame and the set of data frames, the second sampling data frame comprising at least one second sampling word dedicated to a second logical channel; a second further sampling data frame following the first further sampling data frame, the second further sampling data frame comprising at least one second further sampling word dedicated to the second logical channel; and wherein the set of data frames comprises, in a compressed format, a plurality of predefined status data words dedicated to the first and second logical channels.

7. The communication unit of claim 1, wherein the first sampling data frame and the first further sampling data frame have a first frame size, and wherein the set of data frames comprises at least one compressed status data frame having a second frame size that is smaller than the first frame size, the at least one compressed status data frame comprising, in a compressed format, a plurality of predefined status data words dedicated to the first logical channel.

8. The communication unit of claim 7, further comprising: a second sampling data frame arranged between the first sampling data frame and the set of data frames, the second sampling data frame comprising at least one second sampling word dedicated to a second logical channel; and a second further sampling data frame following the first further sampling data frame, the second further sampling data frame comprising at least one second further sampling word dedicated to the second logical channel.

9. The communication unit of claim 8, wherein the set of data frames comprises at least one further compressed status data frame having the second frame size, the at least one further compressed status data frame comprising, in a compressed format, a plurality of predefined status data words dedicated to the second logical channel.

10. The communication unit of claim 8, wherein the at least one compressed status data frame comprises, in a compressed format, a plurality of predefined status data words dedicated to the first and second logical channels.

11. A communication unit comprising:
a one or more buffers configured to store a plurality of sampling data frames; and
an interface configured to receive the plurality of sampling data frames from the one or more buffers and to generate a frame structure for transmitting data over a digital interface, comprising:
a first sampling data packet having a first packet size and comprising at least one sampling word to be transmitted over a first logical channel;
at least one compressed status data packet following the first sampling data packet, having a second packet size that is smaller than the first packet size and comprising, in a compressed format, a plurality of predefined status data words dedicated at least to the first logical channel; and
a first further sampling data packet following the at least one compressed status data packet, having the first packet size and comprising at least one sampling word to be transmitted over the first logical channel.

12. The communication unit of claim 11, wherein the plurality of predefined status data words correspond to a continuous time base information.

13. The communication unit of claim 11, further comprising: a second sampling data packet arranged between the first sampling data packet and the at least one compressed status data packet, the second sampling data packet comprising at least one sampling word to be transmitted over a second logical channel; and a second further sampling data packet following the first further sampling data packet and comprising at least one sampling word to be transmitted over the second logical channel.

14. The communication unit of claim 11, further comprising at least one further compressed status data packet having the second frame size, and arranged between the at least one compressed status data packet and the first further sampling data packet, the at least one further compressed status data packet comprising, in a compressed format, a plurality of predefined status data words dedicated to the second logical channel.

15. The communication unit of claim 11, wherein the at least one compressed status data packet comprises, in a compressed format, a plurality of predefined status data words dedicated to the first and second logical channels.

16. The communication unit of claim 11, wherein a quantity of the predefined status data words of the at least one compressed status data packet in a compressed format corresponds to a quantity of sampling words of the first or first further sampling data packet of the first size.

17. The communication unit of claim 11, wherein each of the at least one status data packet and the sampling data packets comprises a header section and a payload section, and wherein a dedication to the first or to the second logical channel, or both, is determined in a respective header section and sampling words or status data words within a respective payload section.

18. The communication unit of claim 17, wherein for each of the at least one status data packet and the sampling data packets a size of a respective payload section or a first or second packet size, or both, are determined in a respective header section of the respective data packet.

19. A method for organizing data, in a digital communication unit, to be transmitted over a digital interface, comprising: generating a first sampling data frame based on at least one sampling word, wherein the first sampling data frame is dedicated to a first logical channel; generating a set of data frames following the first sampling data frame, the set of data frames comprising, in a compressed format, a plurality of predefined status data words dedicated at least to the first logical channel; and generating a first further sampling data frame based on at least one further sampling word, and following the set of data frames, wherein the first further sampling data frame is dedicated to the first logical channel.

20. The method of claim 19, wherein the plurality of predefined status data words corresponds to a continuous time base information.

21. The method of claim 19, wherein the set of data frames comprises: a first status data frame indicating a beginning of the plurality of predefined status data words; and a second status data frame indicating an end of the plurality of predefined status data words.

22. The method of claim 21, wherein the second status data frame comprises information about a quantity of the plurality of predefined status data words.

23. The method of claim 21, further comprising: generating a second sampling data frame arranged between the first sampling data frame and the set of data frames, the second sampling data frame based on at least one second sampling word and dedicated to a second logical channel; generating a second further sampling data frame following the first further sampling data frame, the second further sampling data frame based on at least one further second sampling word and dedicated to the second logical channel; and wherein generating the set of data frames such comprises at least one data frame arranged between the first status data frame and the second status data frame, and comprises a predefined number of predefined status data words dedicated to the first and second logical channels.

24. The method of claim 19, further comprising: generating a second sampling data frame between the first sampling data frame and the set of data frames, the second sampling data frame based on at least one second sampling word and dedicated to a second logical channel; generating a second further sampling data frame following the first further sampling data frame, the second further sampling data frame based on at least one further second sampling word and dedicated to the second logical channel; and wherein generating the set of data frames comprises generating, in a compressed format, a plurality of predefined status data words dedicated to the first and second logical channels.

25. The method of claim 19, wherein the first sampling data frame and the first further sampling data frame have a first frame size, and wherein the set of data frames comprises at least one compressed status data frame having a second frame size that is smaller than the first frame size, the at least one compressed status data frame comprising, in a compressed format, a plurality of predefined status data words dedicated to the first logical channel.

26. The method of claim 25, further comprising: generating a second sampling data frame between the first sampling data frame and the set of data frames, the second sampling data frame based on at least one second sampling word and dedicated to a second logical channel; and generating a second further sampling data frame following the first further sampling data frame, the second further sampling data frame based on at least one further second sampling word and dedicated to the second logical channel.

27. The method of claim 26, wherein the set of data frames comprises at least one further compressed status data frame having the second frame size, the at least one further compressed status data frame comprising, in a compressed format, a plurality of predefined status data words dedicated to the second logical channel.

28. The method of claim 26, wherein the at least one compressed status data frame comprises, in a compressed format, a plurality of predefined status data words dedicated to the first and second logical channels.

29. The method of claim 19, further comprising transmitting the generated data frames over the digital interface.

30. A method for organizing data, in a digital communication unit, to be transmitted over a digital interface, comprising: generating a first sampling data packet based on at least one sampling word to be transmitted over a first logical channel, the first sampling data packet having a first packet size; generating at least one compressed status data packet following the first sampling data packet, having a second packet size that is smaller than the first packet size, and comprising, in a compressed format, a plurality of predefined status data words dedicated at least to the first logical channel; and generating a first further sampling data packet based on at least one further sampling word to be transmitted over the first logical channel, the first further sampling data packet following the at least one compressed status data packet and having the first packet size.

31. The method of claim 30, wherein the plurality of predefined status data words corresponds to a continuous time base information.

32. The method of claim 30, further comprising: generating a second sampling data packet arranged between the first sampling data packet and the at least one compressed status data packet, the second sampling data packet based on at least one second sampling word to be transmitted over a second logical channel; and
generating a second further sampling data packet following the first further sampling data packet and based on at least one second further sampling word to be transmitted over the second logical channel.

33. The method of claim 32, wherein the at least one further compressed status data packet is the second packet size and is arranged between the at least one compressed status data packet and the first further sampling data packet, the at least one further compressed status data packet comprising, in a compressed format, a plurality of predefined status data words dedicated to the second logical channel.

34. The method of claim 32, wherein the at least one compressed status data packet comprises, in a compressed format, a plurality of predefined status data words dedicated to the first and second logical channels.

35. The method of claim 30, wherein a quantity of the predefined status data words in the at least one compressed status data packet in a compressed format corresponds to a quantity of sampling words in a sampling data packet of the first size.

36. The method of claim 30, wherein each of the status data packets and the sampling data packets comprises a header section and a payload section, and wherein a dedication to the first or the second logical channel, or both, is determined in a respective header section and sampling words or status data words in a respective payload section.

37. The method of claim 32, wherein for each of the status data packets and the sampling data packets a size of a respective payload section or a size of a first or second packet size, or both, are determined in a respective header section of the respective data packet.

38. A method for transmitting data over a digital interface, comprising:
transmitting sampling data frames comprising at least one sampling word to be transmitted over the digital interface, the sampling data frames dedicated to a first logical channel and bearing reference to a continuous time base of the first logical channel; and transmitting a plurality of predefined status data words in a compressed format dedicated at least to the first logical channel, and adapted to maintain the continuous time base of the first logical channel during a time period in which no sampling words dedicated to the first logical channel are to be transmitted.

39. The method of claim 38, further comprising: transmitting further sampling data frames comprising at least one further sampling word dedicated to a second logical channel, wherein the plurality of predefined status data words are further dedicated to the second logical channel.

* * * * *